United States Patent
Maggiore et al.

(10) Patent No.: US 12,127,076 B2
(45) Date of Patent: *Oct. 22, 2024

(54) ASSISTING EXECUTION OF MANUAL PROTOCOLS AT PRODUCTION EQUIPMENT

(71) Applicant: Apprentice FS, Inc., Jersey City, NJ (US)

(72) Inventors: Frank Maggiore, Jersey City, NJ (US); Angelo Stracquatanio, Jersey City, NJ (US); Nabil Hajj Chehade, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,996

(22) Filed: Nov. 10, 2022

(65) Prior Publication Data

US 2023/0073171 A1  Mar. 9, 2023

Related U.S. Application Data

(63) Continuation of application No. 16/425,782, filed on May 29, 2019, now Pat. No. 11,528,582.

(Continued)

(51) Int. Cl.
*H04W 4/021* (2018.01)
*H04W 4/029* (2018.01)
(Continued)

(52) U.S. Cl.
CPC .......... *H04W 4/029* (2018.02); *H04W 4/022* (2013.01); *G06T 19/006* (2013.01); *H04W 4/023* (2013.01)

(58) Field of Classification Search
CPC ..... H04W 4/029; H04W 4/022; H04W 4/023; H04W 4/025; H04W 4/33; G06T 19/006; G05B 19/41855; G05B 19/41835
(Continued)

(56) References Cited

U.S. PATENT DOCUMENTS 8,341,741 B2 * 12/2012 Wang ................. H04L 63/1408
 713/189
8,606,544 B2 * 12/2013 Miller .................... G05B 17/02
 702/185

(Continued)

FOREIGN PATENT DOCUMENTS

| EP | 3174319 | * | 5/2017 | |
| JP | 2011-81715 A | * | 4/2011 | ............. G08C 19/00 |
| KR | 20170057854 | * | 5/2017 | ............. H04W 4/14 |

OTHER PUBLICATIONS

Villarubia et al, "Hybrid Indoor Location System for Museum Tourist Routes in Augmented Reality", 2014, pp. 8, downloaded from https://ieeexplore.ieee.org/document/6916238 (Year: 2014).*

(Continued)

*Primary Examiner* — Robert E Fennema
*Assistant Examiner* — Olvin Lopez Alvarez
(74) *Attorney, Agent, or Firm* — Run8 Patent Group, LLC; Peter Miller; Alexander Rodriguez

(57) ABSTRACT

One variation of a method for assisting execution of manual protocols at production equipment includes: identifying a site occupied by a mobile device based on a geospatial location of a device; identifying a space within the building occupied by the device based on identifiers of a set of wireless access points wirelessly accessible to the device and known locations of wireless access points within the building; loading a protocol associated with an equipment unit in the space; calculating a position of the device within the space based on positions optical features, detected in a (Continued)

field of view of an optical sensor at the device, relative to reference features represented in a space model of the space; and, when the position of the device falls within a threshold distance of a reference location proximal the equipment unit defined in a step of the procedure, rendering guidance for the step.

20 Claims, 5 Drawing Sheets

Related U.S. Application Data

(60) Provisional application No. 62/677,562, filed on May 29, 2018.

(51) Int. Cl.
  *G06T 19/00* (2011.01)
  *H04W 4/02* (2018.01)

(58) Field of Classification Search
  USPC .......................................................... 700/83
  See application file for complete search history.

(56) References Cited

U.S. PATENT DOCUMENTS

| | | | |
|---|---|---|---|
| 11,327,121 B2* | 5/2022 | Pressman | G01R 31/3648 |
| 2002/0147717 A1* | 10/2002 | Barros | H04L 67/52 |
| 2011/0133940 A1* | 6/2011 | Margalit | E06B 3/66366 |
| | | | 52/204.593 |
| 2013/0247117 A1* | 9/2013 | Yamada | H04W 4/029 |
| | | | 340/12.5 |
| 2014/0114598 A1* | 4/2014 | Almadi | H04L 69/28 |
| | | | 702/89 |
| 2015/0296188 A1* | 10/2015 | Meganathan | G08B 13/19682 |
| | | | 348/143 |
| 2016/0034017 A1* | 2/2016 | Chang | G06F 1/3231 |
| | | | 345/212 |
| 2018/0130260 A1* | 5/2018 | Schmirler | G06F 3/011 |
| 2018/0239840 A1* | 8/2018 | Santarone | G06T 19/00 |
| 2018/0357907 A1* | 12/2018 | Reiley | H04W 4/023 |

OTHER PUBLICATIONS

Haramaki et al, "A Network Topology Visualization System Based on Mobile AR Technology" 2015, pp. 6, downloaded from https://ieeexplore.ieee.org/document/7098004?arnumber=7098004 (Year: 2015).*

Vo et al, "A Survey of Fingerprint-Based Outdoor Localization", 2016, pp. 491-506, downloaded from https://ieeexplore.ieee.org/document/7131436 (Year: 2016).*

* cited by examiner

ASSISTING EXECUTION OF MANUAL PROTOCOLS AT PRODUCTION EQUIPMENT

CROSS-REFERENCE TO RELATED APPLICATIONS

This Application is a continuation application of U.S. Non-Provisional application Ser. No. 16/425,782, filed on 29 May 2019, which claims the benefit of U.S. Provisional Application No. 62/677,562, filed on 29 May 2018, which is incorporated in its entirety by this reference.

TECHNICAL FIELD

This invention relates generally to the field of equipment operation in manufacturing and more specifically to a new and useful method for assisting execution of manual protocols at production equipment in the field of equipment operation in manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

Figure 1:
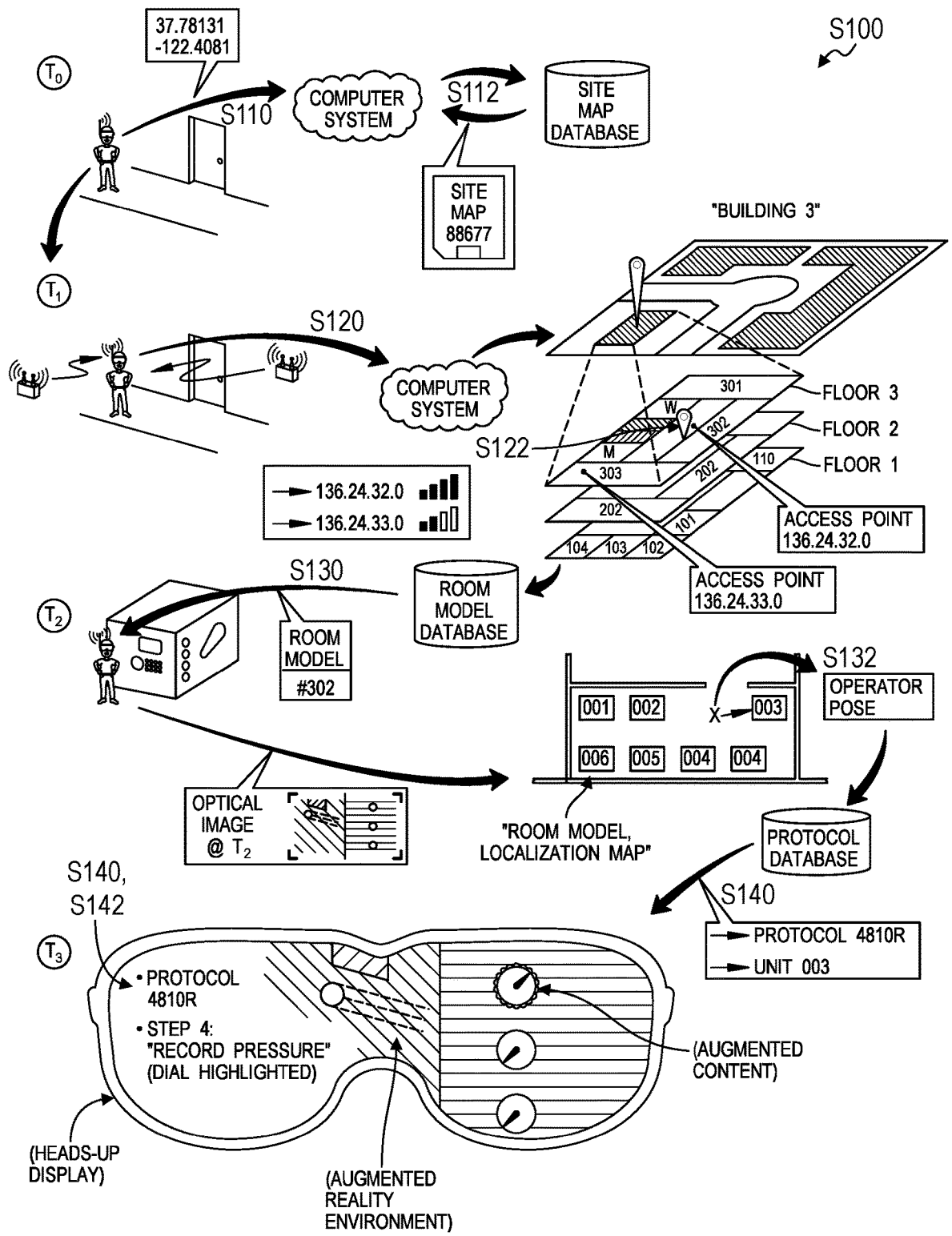
FIG. 1 is a flowchart representation of a method.

As shown in FIG. 1, method S100, for assisting execution of manual protocols at production equipment includes: accessing a geospatial location of a mobile device in Block S110; identifying a site containing the geospatial location of the mobile device based on the geospatial location of the mobile device in Block S112; accessing wireless connectivity of the mobile device to nearby wireless access points in Block S120; estimating a particular location within a particular building occupied by the mobile device based on wireless connectivity of the mobile device to nearby wireless access points and known locations of wireless access points within the particular building in Block S122; loading a space model representing optical features of the particular room onto the mobile device in Block S130; at the mobile device, confirming presence of the mobile device in the particular room based on alignment between the space model and optical features detected in a field of view of an optical sensor integrated into the mobile device in Block S134; in response to confirming presence of the mobile device in the particular room, loading a protocol associated with an equipment unit in the room onto the mobile device in Block S140; at the mobile device, tracking a position of the mobile device relative to the equipment unit based on the space model and optical features detected in the field of view of the optical sensor in Block S142 and rendering a guidance for a step in the protocol, aligned with a corresponding element of the equipment unit, on a display coupled to the mobile device in Block S144.

One variation of the method shown in FIG. 5 includes: accessing a geospatial location of a mobile device in Block S110; identifying a particular site occupied by the mobile device based on the geospatial location in Block S112; accessing identifiers of a first set of (i.e., one or more) wireless access points (hereinafter "APs") wirelessly accessible to the mobile device in Block S120; based on identifiers of the set of wireless APs and known locations of wireless APs within the particular building, identifying a particular space within the particular building within the particular site occupied by the mobile device in Block S122; loading a protocol associated with an equipment unit in the particular space in Block S140, the protocol defining a sequence of steps for operation of the equipment unit by a user; detecting a first set of optical features in a field of view of an optical sensor integrated into the mobile device in Block S132; calculating a first position of the mobile device within the particular space based on positions of the first set of optical features relative to a constellation of reference features represented in a space model of the particular space in Block S134; and, in response to the first position of the mobile device falling within a first threshold distance of a first reference location proximal the equipment unit associated with a first step of the protocol, serving a first guidance for the first step to the user in Block S144.

Figure 5:
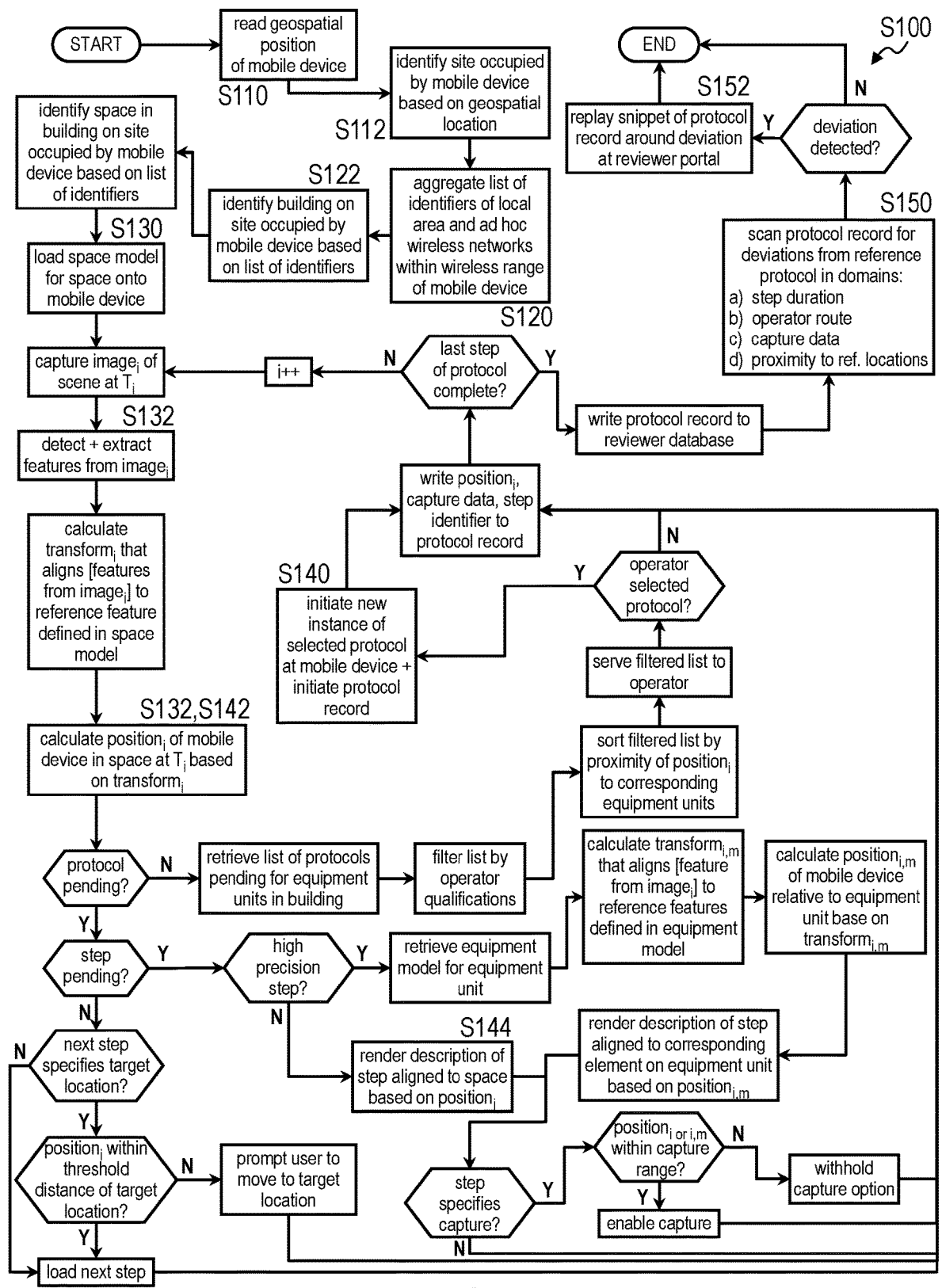
FIG. 5 is a flowchart representation of one variation of the method.

Another variation of the method shown in FIG. 5 includes: accessing a geospatial location of a mobile device in Block S110; identifying a particular site occupied by the mobile device based on the geospatial location in Block S112; accessing identifiers of a first set of wireless APs wirelessly accessible to the mobile device in Block S120; based on identifiers of the set of wireless APs and known locations of wireless APs within the particular building, identifying a particular space within the particular building within the particular site occupied by the mobile device in Block S122; detecting a first set of optical features in a field of view of an optical sensor integrated into the mobile device in Block S132; confirming presence of the mobile device in the particular space based on alignment between the first set of optical features and a constellation of reference features represented in a space model of the particular space in Block S134; following confirming presence of the mobile device in the particular space, loading a protocol associated with an equipment unit in the particular space in Block S140, the protocol defining a sequence of steps for operation of the equipment unit by a user; tracking a position of the mobile device relative to the equipment unit based on locations of the first set of optical features detected in the field of view of the optical sensor and the constellation of reference features represented in the space model in Block S142; and, at the mobile device, in response to the position of the mobile device falling within a first threshold distance of a location proximal the equipment unit associated with a first step of the protocol, serving a guidance for the first step to the user in Block S144.

Yet another variation of the method shown in FIG. 1 includes: accessing a geospatial location of a mobile device in Block S110; identifying a particular site occupied by the mobile device based on the geospatial location in Block S112; accessing identifiers of a first set of wireless APs wirelessly accessible to the mobile device in Block S120; based on identifiers of the set of wireless APs and known locations of wireless APs within the particular building, identifying a particular space within the particular building within the particular site occupied by the mobile device in Block S122; in response to identifying the particular space occupied by the mobile device, loading a space model representing a constellation of reference features within the particular space; loading a protocol associated with an equipment unit in the particular space in Block S140, the protocol defining a sequence of steps for operation of the equipment unit by a user; detecting a first set of optical features in a field of view of an optical sensor integrated into the mobile device in Block S132; calculating a position of the mobile device relative to the equipment unit based on positions of the first set of optical features relative to the constellation of reference features represented in the space model in Block S134; and at the mobile device, initiating a first step, in the protocol, associated with a particular element on the equipment unit and rendering a guidance for the first step, visually aligned with the particular element on the equipment unit, on a display coupled to the mobile device based on the position of the mobile device in Block S144.

2. APPLICATIONS

Generally, the method S100 is described below as executed by a mobile device and a computer system to serve protocols for testing and operating biotechnical and/or pharmaceutical production workspaces where the operator receives guidance and instructions for the performance of a plurality of guided work instructions, tasks, and/or protocols related to the manufacturing of a product, the assembly of a product, performing a checklist, and other step-by-step procedures. In this embodiment the operator is using equipment (hereinafter "equipment units"), which may necessarily be disconnected from local area networks and local wireless networks in order to limit opportunity for remote hacking or exploitation of these equipment and which may therefore require manual input and manual recordation of data during testing and operation. More specifically, the mobile device and the remote computer system can cooperate to provide real-time guidance to an operator performing a test or operational protocol at an equipment unit by automatically: tracking the position of the mobile device in space relative to the equipment unit; presenting a sequence of prompts related to the protocol within an augmented reality environment; highlighting—within the augmented reality environment—manual input regions and data capture regions on the equipment unit according to steps of the protocol; recording video of select steps within the protocol; reading quantitative and/or qualitative values from the equipment unit according to a current step of the protocol; and/or recording these values, such as to an electronic lab notebook. The mobile device can thus execute Blocks of the method S100 in order to form a one-way physically-isolated gateway for automatically collecting data from equipment units and can define an operator portal through which real-time, spatial guidance is served to an operator as the operator manually interfaces with these equipment units, thereby: streamlining testing and operation of these equipment units; reducing opportunity data capture and manual input error; and improving operator efficiency without substantively reducing security of these equipment units.

In order to minimize latency, achieve high spatial accuracy, and thus serve accurate spatial guidance to an operator and collect targeted data from an equipment unit, the mobile device may cooperate with the remote computer system to execute Blocks of the method S100. More specifically, the remote computer system can execute Blocks of the method S100: to isolate the mobile device to a particular site based on a geospatial location (e.g., a "GPS" location) of the mobile device; to isolate the mobile device to a particular floor or subarea of a particular floor of a particular building on the site based on wireless APs that are within wireless range of the mobile device; to isolate a particular room in this particular building likely to be occupied by the mobile device based the mobile device's wireless connectivity to these wireless APs; and to then selectively upload a 2D or 3D model (e.g., a "localization map") of this particular room to the mobile device. The mobile device can then: collect optical data (e.g., 2D color images, depth images, 3D LIDAR scans, infrared images, multispectral images) of the space it occupies; extract features from these optical data; and then calculate its pose (i.e., its position and orientation) within the room—such as relative to an equipment unit in the room—by locating these features within the localization map of the particular room.

For example, the remote computer system can: localize the mobile device to a site, a building, a floor, and/or to a subarea of a floor of a building based on geospatial and wireless connectivity data collected by the mobile device; predict a particular room in the building occupied by the mobile device according to these wireless connectivity data; and then selectively push a localization map of the room to the mobile device in order to enable the mobile device to localize itself to a high level of position accuracy and with low latency. Upon receipt of a localization map of a room (likely to be) occupied by the mobile device, the mobile device can track its pose (i.e., location and orientation) within the room by regularly sampling its integrated or connected optical sensor, extracting features from images recorded by the optical sensor, and calculating transforms that project these features onto corresponding reference features in the localization map. Therefore, rather than store a localization map for an entire site, building, or floor of a building over an extended period of time and downloading updates to this localization map over time, the mobile device can download a localization map for a particular room (or other subregion) of a floor of a building on this site when geospatial and wireless connectivity data indicate that the mobile device is present in this particular room, thereby minimizing memory allocation for a localization map on the mobile device. The mobile device can then locally track its pose within the room based on the localization map and features detected in the field of view of its optical sensor, thereby minimizing localization latency and data uploaded from the mobile device. The mobile device can then discard this localization map when the mobile device exits the room or at the end of a current shift, etc. When the mobile device returns to this room at a later time, the mobile device can cooperate with the remote computer system to re-download a localization map for the room, such as an updated localization map regenerated based on new optical data collected from computing devices passing through the room since the mobile device last downloaded a localization map of the room.

Furthermore, once the mobile device calculates its pose within the particular room and thus confirms its presence in this room, the mobile device can: automatically retrieve a protocol for an equipment test or production process on a particular equipment unit adjacent the mobile device; and render augmented reality content—aligned to features detected in the field of view of the headset—on the mobile device, a connected augmented reality device, thereby providing real-time, localized guidance for completing this protocol to an operator. For example, the mobile device can insert a prompt, icon, or bounding box spatially-aligned to a material input, valve, dial, lever, keypad, or other input region on the equipment unit—specified in a current step of the protocol—in an augmented reality environment rendered on a heads-up display connected to or integrated into the mobile device, thereby directing the operator wearing the heads-up display to this input region. The mobile device can also insert a prompt, icon, or bounding box spatially-aligned to a material window, dial, or other display on the equipment unit—specified in a current step of the protocol—in the augmented reality environment rendered on the heads-up display, thereby directing the operator to manually record a value from the display or to move the mobile device near enough to the display to automatically read and record a value from the display.

3. SYSTEM

Generally, Blocks of the method S100 can be executed by a system including: a computer system, such as a remote server or a computer network; and a local computing device, or connected to an augmented reality headset. For example, the mobile device can include a heads-up display, eyes-up display, head-mounted display, or smart glasses configured to render augmented reality content for an operator wearing this mobile device. Alternatively, the mobile device can include a Wi-Fi-enabled smartphone or tablet connected to a separate augmented reality device.

Furthermore, the mobile device can include: a suite of sensors (e.g., an accelerometer, gyroscope, compass, gravity sensor, barometer, proximity sensor, magnetometer, ambient light sensor) configured to collect information about the mobile device's environment; local memory configured to temporarily store a localization map of a room; and a controller configured to execute Blocks of the method S100, including determining a location of the mobile device in real space based on the localization map and data collected by the suite of sensors. For example, the mobile device can include: a depth camera paired with a 2D color camera; or a pair of stereoscopic 2D color cameras. Each of these optical sensors can output a video feed containing a sequence of digital photographic images (or "frames"), such as at a rate of 20 Hz, and the controller can compile concurrent frames output by these optical sensors into a 3D point cloud or other representation of surfaces or features in the field of view of the mobile device. Following receipt of a localization map of a room occupied by the mobile device and generation of a 3D point cloud (or other representation of surfaces or features in the field of view of the mobile device), the controller can implement point-to-plane fitting or other techniques to calculate a transform that maps the 3D point cloud onto the localization map in order to determine the pose of the mobile device within the room.

However, the mobile device can include any other type of sensor in any other quantity and can implement any other method or technique to calculate its pose within a room based on a localization map of the room and data recorded by these sensors.

4. SITE MAP AND INTERIOR MODEL

The remote computer system can generate and maintain a map of a site, including geospatial, wireless, and optical features representing the site, buildings on the site, floors within these buildings, and rooms within the floors at different levels of resolution. For example, a campus can be defined by a geospatially-referenced site boundary or associated with a geospatial site reference point within a site map; each building on the campus can be defined by a geospatially-referenced building boundary, associated with a geospatial building reference point, and/or associated with a set of (i.e., one or more) unique identifiers of wireless APs (e.g., Wi-Fi routers) located in this building; each floor in this building can be associated with a set of unique identifiers of wireless APs located on this floor; and each room on this floor of the building can be associated with a unique identifier of particular wireless APs located in this room or associated with unique identifiers of wireless APs within wireless range of this room (i.e., detectable by wireless-enabled devices occupying this room) and linked to a model (e.g., a "localization map") and specific to this room.

The remote computer system can thus interface with an administrator—such as through an administrator portal accessed through a native application or web browser executing on the administrator's computing device—to generate and maintain a hierarchy of data representing this site, including: a geospatial map of the site and building on the site; wireless site surveys of other wireless access maps of floors and rooms inside these buildings; and discrete space models for individual rooms, clusters of rooms, or sub-volumes of rooms on these floors.

4.1 Layered Site Map

Figure 2:
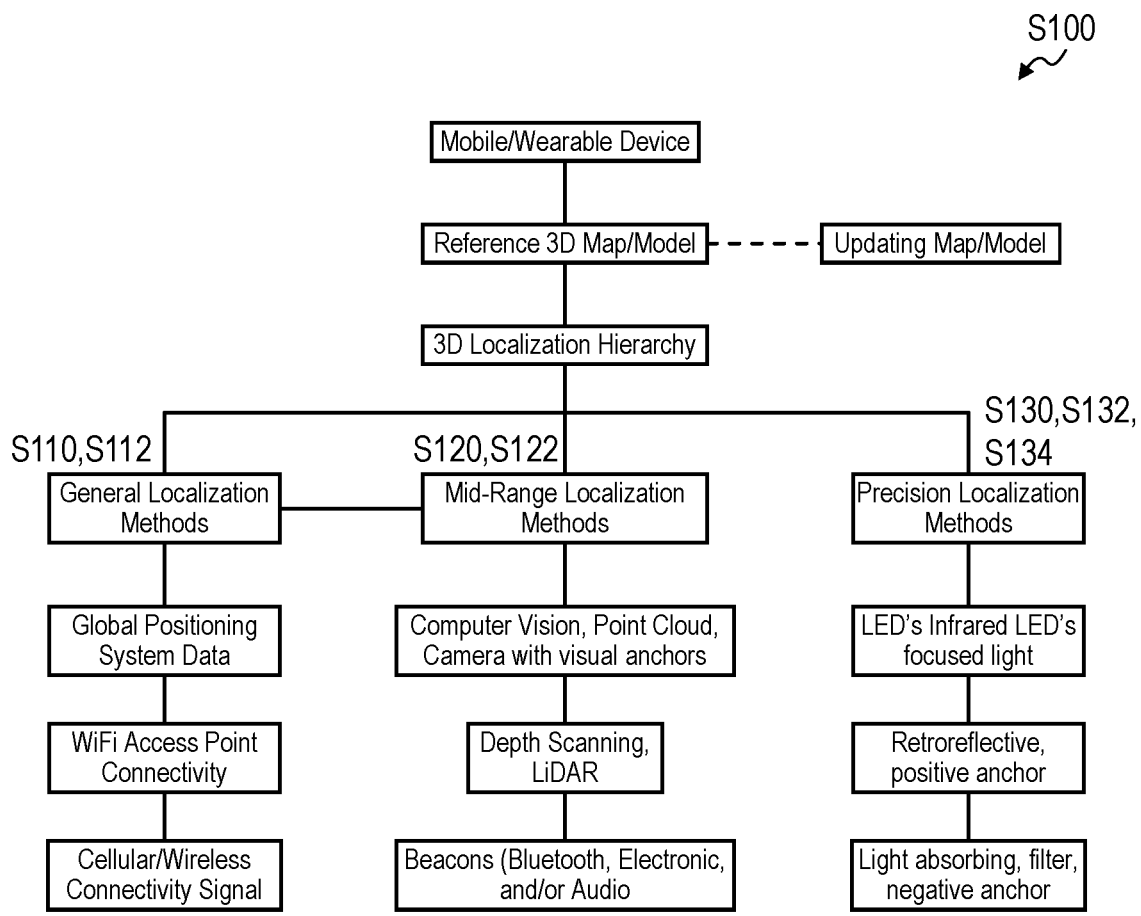
FIG. 2 is a flowchart representation of one variation of the method.

In one implementation shown in FIG. 2, a site map includes a set of layers representing a site, buildings within the site, floors within these buildings, and rooms within these floors. In this implementation, to construct the site map, the remote computer system can: retrieve a virtual map of a geographic region containing the site; extract a map section encompassing the site in the virtual map, such as automatically based on a site address supplied by the administrator or based on a boundary of the site drawn manually over the map by the administrator via the administrator portal; extract geospatial reference markers for this map section from the virtual map; and store the georeferenced map section in a site layer of the site map.

4.1.1 Building Layers

The remote computer system can extract boundaries around discrete buildings from the isolated map section, such as by implementing computer vision techniques to detect perimeters of these buildings in the map section or based on perimeters of these buildings drawn manually over the map by the administrator via the administrator portal. The remote computer system can then: extract geospatial reference markers for each of these buildings; generate a building layer for select buildings on the site; populate each of these building layers with a georeferenced representation of its corresponding building; and load these building layers into the site map. (Alternatively, the remote computer system can annotate the site layer with georeferenced representations of each of these buildings.) The remote computer system can additionally or alternatively: access an architectural or engineering plan of the site; and extract a site layer and/or a set of building layers for buildings on the site from this architectural or engineering plan of the site.

4.1.2 Floor Layers

For each of these buildings, the remote computer system can then access an architectural plan, an engineering plan, a utilities plan, and/or a wireless site survey for the building, such as uploaded by the administrator via the administrator portal or selected from a remote database by the administrator via the administrator portal. The remote computer system can: extract a floor plan of select floors in the building from the architectural or engineering plan, such as automatically or with supervision of the administrator; generate a floor layer for each of these floors in the building; annotate each floor layer with unique identifiers and locations of wireless APs indicated in the wireless site survey for the building; and load these building layers into the site map. For example, the remote computer system can: intake the wireless site survey in the form of a table or spreadsheet uploaded or selected by the administrator via the administrator portal; extract locations and unique identifiers of wireless APs throughout a floor, a building, or the site generally from this table or spreadsheet; and populate corresponding floor layers in the site map with locations and unique identifiers of wireless APs present on these floors. (Alternatively, the remote computer system can: access a wireless site survey containing a map or gradient of wireless signal strength, upload speed, download speed, and/or wireless signal quality, etc. throughout a floor, throughout a building, or throughout the site; and load a particular segment of a wireless site survey corresponding to a particular floor into a floor layer for this particular floor.)

4.1.3 Room Layers and Space Models

Furthermore, the remote computer system can access 2D or 3D representations of optical features of select rooms on select floors in select buildings on the site, such as uploaded by the administrator via the administrator portal or selected from a remote database via the administrator portal. For example, the remote computer system can: interface with the administrator through the administrator portal to identify rooms of interest (e.g., rooms in which equipment linked to virtual-assist protocols is present); and access a database of optical fiducials (e.g., passive QR codes or barcodes, active light elements) present in these rooms of interest, such as: immutable optical fiducials installed in these rooms and their 2D or 3D locations; optical fiducials present on fixed equipment located in these rooms and their 2D or 3D locations; and/or optical fiducials applied to mobile equipment frequently assigned to these rooms or available in these floors or buildings. The remote computer system can then: initialize a room layer for a room in this set; and insert representation of optical fiducials representing this room, optical fiducials present on equipment permanently located in this room, and/or optical fiducials present on equipment commonly stored in this room or available on the same floor or building into the room layer. The remote computer system can thus generate a room layer (or "space model") that defines a low-resolution representation of the room, including a 2D or 3D map of immutable optical fiducials in the room and a table of optical fiducials that may be present in the room at any given time.

The remote computer system can additionally or alternatively access a 2D or 3D optical scan of a room and then load this 2D or 3D optical scan of the room into the corresponding room layer. For example, this 3D optical scan of the room: can include a 3D point cloud output from a depth sensor or generated by combining stereoscopic 2D color images recorded by 2D color cameras previously articulated within the room; can represent fixed walls, fixed or immobile equipment (desks, manufacturing equipment, lab equipment) present in the room, and doorways within the room; and can include a table of pointers to mobile equipment that may be present in the room, floor, or building, such as chairs, moving carts, or material containers. The remote computer system can load this "high-resolution" 3D optical scan into the room layer for the corresponding room, and this room layer can thus define or include a "space model" representing optical features that are or may be present in the corresponding room at any given time.

For example, a space model can include a 3D localization map that represents immutable surfaces within a corresponding room of interest, such as including floor, wall, and ceiling surfaces and surfaces of equipment units and other fixed equipment located in the particular room. In this example, the space model can also include 2D models, 3D models, template images, or other representations of mobile equipment and other objects: commonly present in the corresponding room, on the corresponding floor, in the corresponding building, on the corresponding site; specified in protocols for equipment units in the corresponding room; or specified in protocols currently pending (i.e., currently incomplete) for equipment units in the corresponding room. The remote computer system can incorporate this space model into a room layer for the corresponding room.

Additionally or alternatively, a space model for a particular space can include a map of wireless signal strengths of local, short-range wireless transmitters (e.g., RFID tags, RFID interrogation antennas, wireless beacons) located on or near equipment units in the particular space. This in this implementation, the mobile device can: identify the site it occupies based on its coarse geospatial location; identify a floor building or building generally occupied by the mobile device based on longer-range wireless signals received from wireless access points in the building; track signal strengths of local, short-range wireless transmitters; and then calculate a fine (e.g., high-resolution, high precision) position of the mobile device within the particular space based on these wireless signal strengths. For example, the mobile device can implement triangulation techniques to transform wireless signal strengths of wireless signals received from these short-range wireless transmitters and known locations of these wireless transmitters in the building in a position of the mobile device in the particular space. (Similarly, the mobile device can calculate its position relative to a particular equipment unit or relative to a particular wireless transmitter in this constellation of short-range wireless transmitters.)

The remote computer system can repeat this process for other select rooms on select floors in select buildings on the site in order to populate a set of room layers (or "space models") representing unique constellations of features that are and/or may be present in these rooms at any given time. The remote computer system can then compile these room layers, floor layers, building layers, and site layer into the site map for the site and store this site map in a site map database.

4.2 Variations

In one variation, the remote computer system can: access architectural and/or engineering plans of the site, buildings on the site, and floors (or "levels") of these buildings from the administrator via an administrator portal, such as described above; and then prompt the administrator to select buildings, floors, or specific rooms of interest (e.g., buildings, floors, or rooms in which equipment linked to virtual-assist protocols is present). The remote computer system can then implement methods and techniques similar to those described above: to generate a geospatial map of the site and various buildings within the site; to link available wireless site surveys to discrete buildings or specific floors containing at least one room of interest selected by the administrator; and to link each room of interest selected by the administrator to a space model, as described above.

The remote computer system can compile the geospatial map of the site, wireless site surveys for specific buildings or floors, and space models for specific rooms of interest into a site map for the site.

However, the remote computer system can generate and store a site map containing any other representation of the site, buildings on the site, floors within these buildings, and/or rooms of interest within these floors in any other form or format.

5. LOCALIZATION

Figure 3:
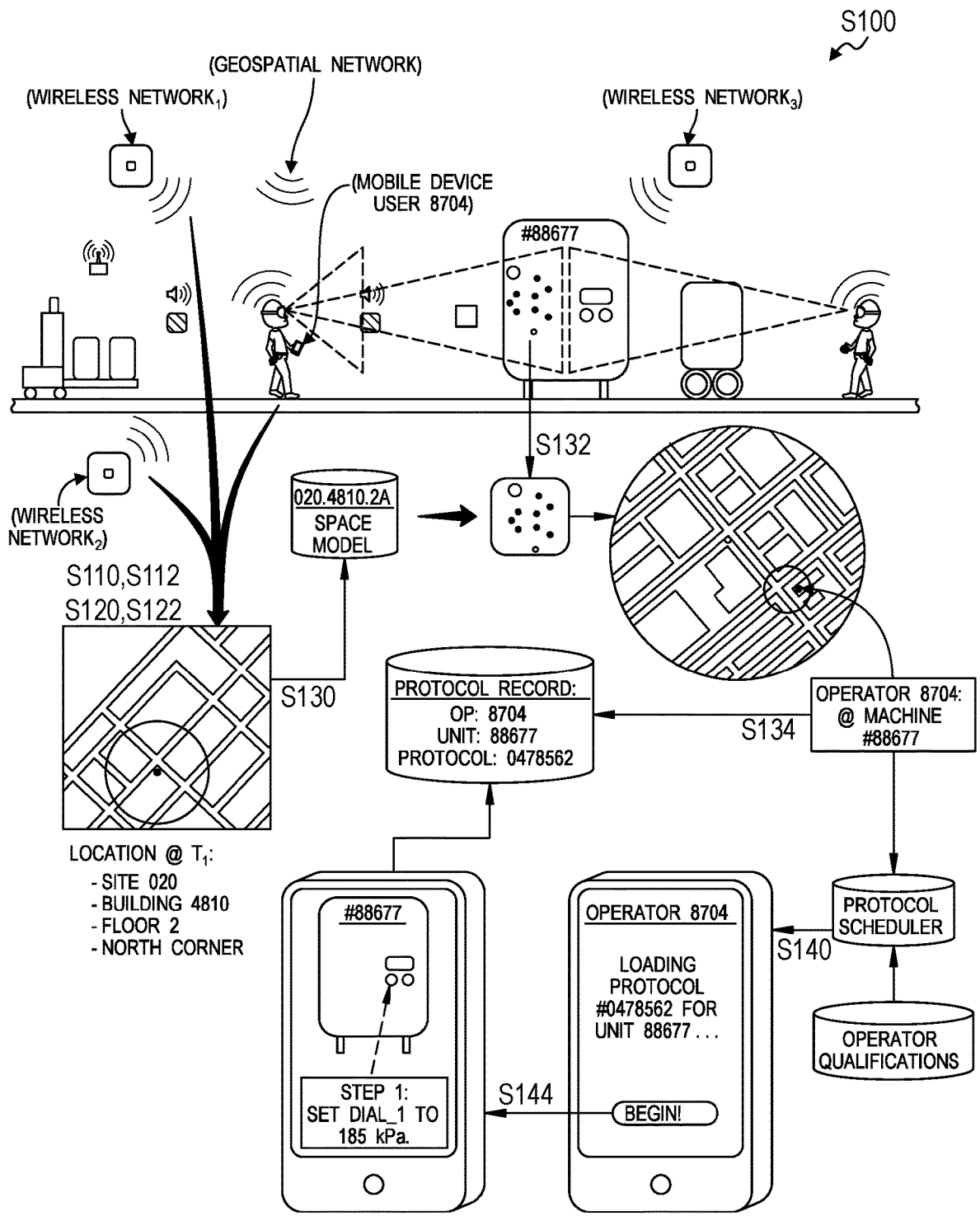
FIG. 3 is a schematic representation of one variation of the method.

The remote computer system and the mobile device can then cooperate to determine a coarse location of the mobile device in Block S112 based on geospatial data collected by the mobile device in Block S110, to determine a location of the mobile device with moderate granularity in Block S122 based on wireless connectivity data collected by the mobile device in Block S120, and to then determine a fine location (or "pose") of the mobile device in Block S134 based on optical data recorded by the mobile device and a space model loaded onto the mobile device in Block S130, as shown in FIGS. 3 and 5.

5.1 Global Localization: Geospatial

During operation, upon receipt of a geospatial location from a mobile device carried or worn by an operator, the remote computer system can query the site map database for a particular site map containing a site layer defining a site boundary that contains the geospatial location of the mobile device and retrieve this particular site map accordingly. The remote computer system can then scan the site layer in the particular site map for a particular building nearest (or containing) the geospatial location of the mobile device. If the remote computer system thus identifies a particular building containing or falling within a threshold geospatial distance of the geospatial location of the mobile device, the remote computer system can predict that the mobile device is occupying the particular building and then extract the building layer and related floor layers for this particular building from the particular site map accordingly.

(The remote computer system can additionally or alternatively predict the mobile device is occupying the particular building if a unique identifier of a wireless AP received by the mobile device matches a unique identifier of a known wireless AP in the particular building, such as stored in the building layer or in a floor layer for the particular building.)

5.2 Local Localization: Wireless Access Points

Once the remote computer system has thus isolated the mobile device to a particular building on the site, the remote computer system can: query the mobile device for a set of unique identifiers of wireless APs currently within wireless range of the mobile device and compare the set of unique identifiers received from the mobile device to unique identifiers of wireless APs located on floors of the particular building—as represented in a set of floor layers for the particular building—in order to isolate the mobile device to a particular floor of the particular building. The remote computer system can then return a space model for each room of interest on the particular floor to the mobile device for further localization of the mobile device.

Alternatively, if the particular floor includes multiple wireless APs and the set of unique identifiers received from the mobile device corresponds to only a subset of these wireless APs, the remote computer system can further isolate the mobile device to a particular subregion of the particular floor in which the wireless APs detected by the mobile device are present. The remote computer system can then aggregate space models for a particular subset of rooms in this particular subregion of the particular floor and return space models for this particular subset of rooms to the mobile device for further localization of the mobile device.

The remote computer system can additionally or alternatively query the mobile device for strengths of wireless signals received from wireless APs that it recently detected. Based on these signals strengths, known locations of wireless APs on the particular floor, and known wireless characteristics of these wireless APs, the remote computer system can triangulate the particular location of the mobile device within the particular floor. For example, the remote computer system can implement RSSI techniques to triangulate the location of the mobile device relative to multiple wireless APs on the particular floor with tolerance of +/−five meters. Similarly, in the implementation described above in which the remote computer system accesses wireless site surveys containing 2D or 3D maps (or gradients) of wireless signal strengths from multiple wireless APs on floors of buildings on the site and stores these maps of wireless signal strengths in floor layers for floors of these buildings, the remote computer system can scan the map of wireless signal strengths stored in the floor layer of the particular floor in order to isolate a particular location likely to be occupied by the mobile device. However, the remote computer system can implement any other method or technique to calculate or estimate a more specific location (or area, subregion) of the mobile device within the particular floor.

Thus, if the remote computer system determines that the mobile device is occupying a hallway, the remote computer system can: scan the floor layer to identify a small number of (e.g., up to four) rooms of interest near the mobile device; aggregate space models for each of these rooms; and return these space models to the mobile device for further localization of the mobile device. Similarly, if the remote computer system thus determines that the mobile device is occupying a particular room but with a loose spatial tolerance, the remote computer system can: calculate a localization window in which the mobile device is likely to be located; scan the floor layer to identify other rooms of interest that intersect the localization window; aggregate space models for the particular room and these other rooms of interest; and then return these space models to the mobile device for further localization of the mobile device.

Alternatively, if the remote computer system thus determines that the mobile device is occupying a particular room with a tight spatial tolerance or otherwise calculates a localization window that intersects only one room of interest, the remote computer system can transmit the space model for this specific room of interest to the mobile device for further localization of the mobile device. Yet alternatively, the remote computer system can upload a space model for a particular room to the mobile device only after determining that the location of the mobile device—determined based on wireless connectivity data collected by the mobile device—intersects a room of interest or intersects a room occupied by an equipment unit scheduled for a test or operational protocol.

In one variation, the user manually indicates the particular building and/or particular space or room she is occupying, such as by manually indicating this space in a virtual map of the site rendered on the display of the mobile device, by selecting this space from a dropdown menu rendered on the mobile device, or orally stating her location to the mobile device. The mobile device can then automatically retrieve a space model for the indicated location of the mobile device, such as described above.

5.4 Local Localization: Wireless Access Points+Optical Features

In one variation, the remote computer system isolates a particular room or space occupied by the mobile device based on a combination of wireless connectivity data and image data collected by the mobile device.

In one implementation, the mobile device generates a list of identifiers and signal strengths of wireless networks accessible to the mobile device and returns these to the remote computer system. The remote controller then implements the foregoing methods and techniques to estimate the mobile device's location, such as by: isolating a particular building occupied by the mobile device based on known locations of wireless APs on the list received from the mobile device; and triangulating the mobile device's location based on signal strengths of the wireless networks and a map or table of geospatial locations of these wireless APs. However, this triangulated location of the mobile device may be relatively inaccurate due to multi-path delays, reflections, and obstructions within the space occupied by the mobile device. Therefore, the mobile device can also transmit a raw image or a descriptor of a set of features extracted from an image recorded by the mobile device to the remote computer system, and the remote computer system can verify the location of the mobile device by comparing features extracted from this image to individual space models for the discrete spaces around the triangulated position of the mobile device or to a global space model for the floor or building occupied by the mobile device.

For example, the remote computer system can: isolate the mobile device to one floor or cluster of spaces in a building based on identifiers and signal strengths of wireless APs accessible to the mobile device; and then retrieve a set of discrete space models (e.g., 3D localization maps) representing discrete spaces on the floor of the building or representing each space in this cluster of spaces. The remote computer system can also query the mobile device for an image (e.g., 2D color image, a 3D depth map or point cloud); or the mobile device can return this image to the remote computer system automatically with the list of wireless APs. For example, the mobile device can opportunistically capture an image when the camera on the mobile device is not obscured, when the mobile device is arranged in an approximately upright orientation (e.g., such that the camera is approximately normal to a nearest wall), and when the mobile device detects limited motion (e.g., such that the resulting image exhibits minimal blur); the mobile device can then return this image to the remote computer system for refined localization. In another example, the mobile device can record a sequence of images (e.g., a "video clip"), select a particular image in this sequence that exhibits least blur and/or depicts a greatest number of distinct features, and return this image to the remote computer system.

Upon receipt, the remote computer system can detect and extract a constellation of features from this image, such as text, iconography, planes, or visual patterns arranged on large surfaces (e.g., floors and walls) depicted in the image. (Alternatively, the mobile device can record and return a video clip to the remote computer system, and the remote computer system can extract features from multiple frames in this video clip. Yet alternatively, the mobile device can extract these features from the image and return a container—such as a matrix or vector describing these extracted features—to the remote computer system.)

The remote computer system can then: scan the set of space models for like or similar features, such as similar text, iconography, or relative positions of planes; and isolate a particular space model—from this set of space models—that contains a greatest number of like or similar features. Upon isolating this particular space model, the remote computer system can implement 2D or 3D localization techniques to calculate a position of the mobile device within a particular space corresponding to this particular space model. For example, the remote computer system can: calculate a transform that aligns the constellation of features extracted from the image to a constellation of like features represented in the particular space model; interpret an initial location (i.e., a position and orientation, or "pose") of the mobile device in the particular space based on this transform; and return the particular space model and the initial location of the mobile device to the mobile device to enable the mobile device to rapidly localize itself within the particular space without necessitating transmission of data to the remote computer system.

Alternatively, the remote computer system can: retrieve a global model of the building floor associated with wireless APs detected by the mobile device; scan the global model for the set of features extracted from the image; localize the mobile device within the global model of the building floor; and then return a segment of the global model around the mobile device's location (e.g., a predefined space model for a particular space containing the mobile device's location, a segment of the global model extracted ad hoc by the remote computer system for the mobile device) and the initial location of the mobile device to the mobile device.

The mobile device can then implement methods and techniques described below to localize the mobile device with a high degree of granularity or resolution by: recording a second image; extracting a second constellation of features from this second image; implementing dead-reckoning techniques to estimate an offset from the initial location received from the remote computer system based on motion of the mobile device between recordation of the first and second images; predicting a second location of the mobile device at the current time based on the sum of the initial location and the offset; scanning the local copy of the space model—around the predicted second location of the mobile device—for the second constellation of features; calculating a second transform that aligns this second constellation of features with a corresponding constellation of like features in the space model; and then calculating and storing this image-based second location and orientation of the mobile device relative to the space based on this second transform. The mobile device can repeat this process for subsequent images recorded by the mobile device, such as until the user disables localization at the mobile device, completes a protocol, or exits the particular space, at which time the mobile device may no longer match features detected in images to features represented in the space model and can thus revert to interfacing with the remote computer system to localize the mobile device based on connectivity to wireless APs.

Therefore, in this variation, the remote computer system can: detect a first set of optical features in a first image recorded by the mobile device at a first time; estimate occupation of the mobile device in a cluster of spaces within a particular building at the first time based on a list of identifiers of wireless APs detected by the mobile device and a map of wireless network connectivity within the particular site; compare the first set of optical features to constellations of reference features represented in a set of space models corresponding to the cluster of spaces; and confirm presence of the mobile device in a particular space—in the cluster of spaces in the particular building—at the first time based on alignment between the first set of optical features and the constellation of reference features represented in the space model of the particular space. The remote computer system can then return—to the mobile device—a relatively small space model depicting features in the particular space most likely to fall in the field of view of the optical sensor in the mobile device, thereby: limiting bandwidth requirements to load localization data onto the mobile device; limiting a file size cached by the mobile device to support localization services; and enabling the mobile device to perform rapid localization processes locally regardless of wireless connectivity while the mobile device remains in or near this particular space.

(Additionally or alternatively, the remote computer system can then return—to the mobile device—a relatively small space model depicting wireless signal strengths of local wireless transmitters located on or near equipment units in the particular space, thereby: limiting bandwidth requirements to load localization data onto the mobile device; limiting a file size cached by the mobile device to support localization services; and enabling the mobile device to perform rapid localization processes locally regardless of connectivity to a wireless access point while the mobile device remains in or near this particular space.)

5.5 Global and Local Localization Variation

In one variation, the mobile device: stores the site, building, and/or floor layers of the site map; locally executes the forgoing methods to estimate the location of the mobile device with moderate granularity based on wireless connectivity data collected by the mobile device; and returns a request for a space model of a particular room to a remote space model database, such as if a space model is available for the particular room or if the particular room is occupied by an equipment unit scheduled for a test or operational protocol, as described above.

The mobile device and/or the remote computer system can regularly repeat the foregoing methods and techniques to track the location of the mobile device with moderate granularity and to selectively upload a space model to the mobile device accordingly.

5.6 Hyper-Local Localization In Space Coordinate System: Optical Fiducials

Following receipt of a space model (e.g., in the form of a 3D localization map) of a particular room occupied by the mobile device, the mobile device can compare optical data read by optical sensors in the mobile device (or in the separate augmented reality device) and the space model to calculate a pose of the mobile device (or the augmented reality device) in real space relative to immutable features in this room. In one implementation, the mobile device regularly: samples optical sensors integrated into the mobile device (or integrated into a connected augmented reality device); compiles concurrent images read by these optical sensors into a 3D point cloud; and implements point-to-plane fitting or other localization techniques to calculate a transform that maps this 3D point cloud onto the space model (e.g., the localization map of the room). This transform can thus represent a pose of the mobile device within the room, and the mobile device can leverage this transform to locate spatial, augmented reality content on the heads-up display of the augmented reality device.

Alternatively, the mobile device can: detect a 2D constellation of features representing a set of active or passive optical fiducials in the space from a 2D image recorded by an optical sensor in the mobile device; calculate a scale, warp, and orientation that projects this 2D constellation of features onto representations of these optical fiducials in the space model; and then derive the location and orientation of the mobile device in the space based on this scale, warp, and orientation.

However, the mobile device can implement any other image-based localization technique to transform optical data recorded by the mobile device (or by a connected device) into a location of orientation (or "pose") of the mobile device in the room. The mobile device can repeat these methods and techniques for subsequent images recorded by the mobile device in order to track the pose of the mobile device over time.

5.7 Example

Therefore, the remote computer system and the mobile device can cooperate to localize the mobile device within a particular room or space in a particular building at a particular site. In one example, as a user enters a job site (e.g., by pulling in to a parking lot at her place of employment), the mobile device can calculate a first geospatial coordinate—in a geospatial coordinate system—of a first location it occupies at a first time and then transmit this first geospatial coordinate and a first query for location services to the remote computer system. The remote computer system can then locate the mobile device at this site at the first time in response to the first geospatial coordinate received from the mobile device intersecting a georeferenced boundary associated with this site. As the user walks from the parking lot into a building on the site, such as to begin a test, experiment, or other procedure at an equipment unit in this building, the mobile device can: aggregate a first list of identifiers of a first set of wireless APs within wireless range of the mobile device at a second, subsequent time; and then transmit this first list of identifiers and a second query for location services to the remote computer system. Accordingly, the remote computer system can estimate occupation of the mobile device in a particular room or space in a particular building on the site based on this first list of wireless AP identifiers and a map or table of wireless network connectivity throughout the site. Once the remote computer system thus identifies the particular space occupied by the mobile device at the second time, the mobile device can download a space model of the particular space (likely to be) occupied by the mobile device. For example, the space model can include a 3D localization map depicting positions of immutable objects and surfaces in the space, such as walls, floor, ceilings, doors, and partitions. Alternatively, the space model can include a 3D localization map depicting positions of active and/or passive optical fiducials, such as: quick-response and barcodes applied to walls and floors; illuminated exit signage near doors; retro-reflector strips applied to reference surfaces; light-absorbing strips applied to reference surfaces; ceiling lighting; and/or dedicated, active optical fiducials containing active light elements.

With the space model for this particular space thus loaded onto the mobile device, the mobile device can: access an image recorded by the optical sensor in the mobile device at a third time; extract a set of optical features (e.g., planes depicting walls and floors; geometries of reflective or absorptive surfaces; positions of active light elements) from this color image; and calculate a position of the mobile device within the particular space at approximately the third time based on positions of the first set of optical features relative to a constellation of reference features represented in the 3D localization map. In particular, the mobile device can derive its location and orientation in the particular space by aligning a 3D constellation of features represented in the space model to: features extracted from a single 2D color image recorded by a color camera in the mobile device; 3D features extracted from a depth map or 3D point cloud recorded by a depth sensor in the mobile device; or 3D features extracted from a synthetic 3D point cloud generated or derived from a sequence of 2D (color) images recorded by a 2D camera.

In this example, the mobile device can also triangulate its location within the particular space based on signal strengths of wireless signals received from local, short-range wireless transmitters located on or near equipment units in the space based on a map of wireless signal strengths of these wireless transmitters stored in the space model. The mobile device can then verify the image-based location thus calculated based on this wireless-based location. Furthermore, during sampling intervals in which the mobile device fails to detect reference features in the field of view of the camera (e.g., when the mobile device is placed face-up on a table such that the camera is obscured), the mobile device can transition to tracking its location within the particular based on wireless signal strengths of these local, short-range wireless transmitters.

(Alternatively, the mobile device can execute high-resolution localization techniques based on wireless connectivity (e.g., signal strength) to these local, short-range wireless transmitters exclusive of optical data. More specifically, in this variation, the mobile device can thus execute methods and techniques described below based on these wireless connectivity to local, short-range wireless transmitters rather than optical data captured by an optical sensor in the mobile device.)

However, the mobile device can implement any other method or technique to calculate its location and orientation in the particular space based on the space model and optical features detected in a field of view of an optical sensor integrated into or connected to the mobile device.

6. PROTOCOL SELECTION

If the mobile device thus determines its location in the particular room based on the space model and optical data thus recorded by optical sensors integrated into the mobile device (or into the separate augmented reality device), the mobile device (or the remote computer system) can automatically identify a particular protocol that is currently pending for an equipment unit nearby and automatically load this protocol in Block S140, as shown in FIGS. 3 and 5.

For example, the remote computer system can store a set of virtual-assist protocols in a database. Each protocol: can be associated with a particular equipment unit or a particular type or class of equipment unit on the site; can include a set of instructions for input into this equipment unit, such as in the form of textual and graphical augmented reality overlays spatially referenced to input regions on the equipment unit; and can include a set of instructions for data capture from this equipment unit, such as in the form of textual and graphical augmented reality overlays spatially referenced to data output regions of the equipment unit. When a protocol is loaded into a mobile device while the mobile device is present near a corresponding equipment unit, the mobile device can render—in the augmented reality environment—a sequence of instructions for input into and data capture from the equipment unit, wherein these instructions are spatially aligned to reference features on the equipment unit in the field of view of an operator and corresponding to a sequence of steps in the protocol, in order to provide real-time, strategic guidance to the operator while testing or operating the equipment unit, thereby reducing opportunity for operator error, increasing operator efficiency, and reducing need for a second operator to oversee the operator while executing this protocol.

In one implementation, once the mobile device determines its pose within the particular room in Block S134, the mobile device (and/or the remote computer system): queries the floor layer, the building layer, or an engineering plan of equipment distribution throughout the building for a type and/or unique identity of a particular equipment unit nearest the mobile device; scans a protocol schedule for this particular equipment unit for a next scheduled protocol for the particular equipment unit; and serves a prompt to an operator carrying the mobile device and/or wearing the augmented reality device to confirm this protocol. The mobile device can then load this protocol once confirmed by the operator.

In a similar implementation, the mobile device (and/or the remote computer system): queries the floor layer, the building layer, or the engineering plan of equipment distribution throughout the building for types and/or unique identities of a cluster of equipment units near the mobile device; scans protocol schedules for these particular equipment units for a next scheduled protocol for a particular equipment unit in this cluster; renders a list of these protocols—such as ranked by time proximity to scheduled completion—on heads-up display; and serves a prompt to the operator to select a protocol in this list. The mobile device can then load a particular protocol selected by the operator and render augmented reality cues on the heads-up display to engage the corresponding equipment unit.

In a similar implementation, the mobile device (or the remote computer system) can filter protocols—queued for equipment units near the mobile device—based on whether the user is qualified to operate these equipment units or otherwise holds qualifications to perform these protocols. For example, in response to identifying the particular space occupied by the mobile device, the mobile device (or the remote computer system) can: access a user profile associated with the user currently assigned or logged into the mobile device; and read a list of specific protocols for which the user is prequalified to perform and/or a list of equipment units the user is qualified to operate from the user's profile. Accordingly, the mobile device (or the remote computer system) can: aggregate a list of protocols queued for equipment units located in the particular building occupied by the user; filter this list of protocols to include only protocols the user is qualified to perform and on equipment units that the user is qualified to operate; and then present this list of protocols to the user, such as by rendering this filtered list of protocols on a display integrated into or connected to the mobile device. In this example, the mobile device can also sort this filtered list of protocols based on proximity of the mobile device to equipment units associated with protocols on this filtered list. As the user moves throughout the space—such as past different equipment units of the same or different equipment types—the mobile device can implement the foregoing methods and techniques to: recalculate the location or the mobile device; query a map of the building, floor, or space currently occupied by the mobile device for equipment units near the mobile device's location; query a scheduler or database for protocols queued for these equipment units; filter this revised list of protocols based on the user's qualifications; re-sort this filtered list of protocols based on proximity of corresponding the equipment units to the mobile device's current location; and prompt the user to select from this re-sorted list of protocols rendered on the mobile device or connected display.

In response to selection of a particular protocol from the list of protocols thus presented to the user, the mobile device can download the particular protocol from a remote database or access this particular protocol from a local cache or local memory.

However, the mobile device can implement any other method or technique to automatically load a protocol for a particular equipment unit or to prompt the operator to elect a particular protocol from a small set of protocols pending for equipment units near the mobile device's current location. The mobile device can then initiate a new instance of the protocol at the mobile device.

7. HYPER-LOCAL LOCALIZATION IN MACHINE COORDINATE SYSTEM

In one variation shown in FIG. 5, once the user (or the mobile device) selects a protocol and initiates a new instance of the protocol for a particular equipment unit in the space, the mobile device can retrieve an equipment model for a type of the particular equipment unit, such as by downloading a 3D model of the particular equipment unit from the remote computer system or other remote database. The mobile device can then implement the foregoing methods and techniques to localize the mobile device to the particular equipment unit based on the equipment model—rather than or in addition to localizing the mobile device to the space based on the space model. In particular, the equipment unit may have moved within the space since the space model was created or last updated. Therefore, the mobile device can implement the equipment model to localize the mobile device to the particular equipment unit (e.g., based on optical features detected in the field of view of the optical sensor in the mobile device) rather than to the space model, thereby enabling the mobile device to reject localization error that may otherwise occur due to past movement of the equipment unit in the space and to render augmented reality guidance—for steps in the protocol—aligned to corresponding features (e.g., input controls, displays) on the equipment unit with a high degree of precision.

For example, once the mobile device accesses the equipment model and initiates the current instance of the protocol, the mobile device can: detect a set of optical features in the field of view of the optical sensor (e.g., by extracting 2D features from one image, by extracting 3D features from one depth map, or by deriving 3D features from a sequence of 2D images recorded by the optical sensor); and calculate a position of the mobile device relative to the equipment unit based on positions of this set of optical features relative to a constellation of reference features represented in the equipment model of the equipment unit. The mobile device can then serve augmented reality guidance—spatially referenced to the equipment unit—for steps of the protocol. Additionally or alternatively, the mobile device can selectively open steps of the protocol (e.g., instructions for input control values; capture pathways for recording numerical, textual, audible, or image-based data from the equipment unit) only after localizing the mobile device to locations within threshold distances of control inputs, displays, or other references locations on the equipment unit associated with these steps.

In this variation, once the mobile device access the equipment model, the mobile device can calculate its location and orientation relative to the equipment unit by default; however, if the mobile device detects an insufficient number or distribution of features—in a video feed recorded by the optical sensor—depicting the equipment unit, the mobile device can transition to localizing the mobile device to the space model, such as when the user turns her back to the equipment unit or faces a worktable near the equipment unit during the protocol. Alternatively, the mobile device can calculate its location and orientation relative to the space based on the space model by default but can transition to localizing itself to the equipment unit during select steps of the protocol associated with augmented reality content spatially-referenced to the equipment unit.

8. HYPER-LOCAL LOCALIZATION: STATIONARY MOBILE DEVICE

In one variation, the mobile device executes the foregoing processes: to extract features from images (or frames, depth maps) recorded by the optical sensor as the mobile device moves throughout the space (e.g., as the user walks through the space, around the equipment unit, and between the equipment unit and support stations in the space); and to localize the mobile device in the space (or relative to the equipment unit) based on these features. However, motion of the mobile device during this process may produce blur in these images, which may increase localization error when the mobile device calculates its position in the space (or relative to the equipment unit) based on comparisons of constellations of blurred features to reference features represented in the space model (or in the equipment model).

Therefore, for steps of the protocol containing augmented reality content flagged (or "tagged") for high spatial accuracy, the mobile device can prompt the user to cease motion and/or hold the mobile device in one approximately static location, thereby enabling the mobile device to capture images with low blur, extract crisp features from these images, and localize the mobile device to the space (or to the equipment unit) with high spatial accuracy based on these crisp features. For example, the mobile device can execute this process to prompt the user to cease motion in preparation for: highlighting a particular switch in a cluster of switches on a control panel; highlighting a particular numerical value to read from a particular location within a string of values on a display; or highlighting a narrow target range of acceptable needle positions on an analog dial.

In one implementation, after loading a step in the protocol associated with a particular element on the equipment unit (e.g., a switch, a value on a display, a dial), the mobile device can: serve a prompt to the user to cease motion for a period of time; access an image (e.g., a color frame, a depth map, a 3D point cloud) recorded by the optical sensor during this period of time; extract a set of optical features from this image; calculate a second transform that projects this set of optical features onto corresponding reference features in the equipment model (or in the space model) with reduced error (i.e., compared to localization based on images recorded during motion of the mobile device); and calculate a position of the mobile device—at increased resolution (i.e., compared to localization based on images recorded during motion of the mobile device) relative to the equipment unit (or within the space) during this period of time. The mobile device can then render guidance for this step of the protocol—visually aligned with the particular element on the equipment unit—such as on a display integrated into or connected to the mobile device.

For example, the mobile device can: implement computer vision techniques to identify the particular element—defining a particular control input in a cluster of control inputs at a control panel on the equipment unit—in this image; extract a location of the particular element from the image; and calculate a position of the particular element in the field of view of a viewfinder rendered on a 2D display integrated into the mobile device or rendered on a heads-up display coupled to the mobile device, such as based on a known offset between the optical sensor that captured the image and the display. The mobile device can then: generate an augmented reality frame containing a visual object (e.g., a color circle) distinguishing the particular control input in the cluster of control inputs and visually aligned with the particular control input when viewed on the 2D or heads-up display; and render the augmented reality frame on the 2D or heads-up display. Subsequently, the mobile device can: prompt the user to perform the indicated steps according to the guidance, including moving the mobile device from its current location; implement dead-reckoning and the preceding methods and techniques to track the location of the mobile device relative to the particular element on the equipment unit as the mobile device moves away from this derived high-resolution location.

Alternatively, the mobile device can implement the foregoing methods and techniques to localize the mobile device based on optical data recorded while the mobile device is in motion near low-risk zones in the space. However, as the mobile device approaches a high-risk zone in the space (e.g., a fall- or slip-prone area, a high-temperature area, an open chemical storage or processing location, a high-radiation area) or prepares to access a high-risk step in the protocol, the mobile device can prompt the user to cease motion of the mobile device, capture optical data while the mobile device is (approximately) static, and localize the mobile device in the space (or relative to the equipment unit) with increased resolution and reduced error based on crisp features extracted from images recorded by the mobile device during this period. The mobile device can subsequently leverage this high-resolution, low-error location of the mobile device while static to maintain relatively high-resolution, relatively low-error localization of the mobile device as the mobile device moves through this high-risk zone or through this high-risk step.

8. MOBILE EQUIPMENT AND SPACE CONFIGURATION

In one variation described above, the mobile device loads a space model that includes 2D models, 3D models, template images, or other representations of mobile equipment and other objects commonly present in the particular room, floor, building, or site and/or specified in pending protocols for equipment units in the particular room occupied by the mobile device. In this variation, the mobile device can execute computer vision methods and techniques—such as template matching, object detection, and/or object recognition—or artificial intelligence techniques to identify mobile equipment and other mutable objects near the mobile device. The mobile device can then construct a map, table, or other representation of the space it occupies, including types and locations of these mobile equipment and other mutable objects.

The mobile device can then write this map, table, or other representation of the configuration of the space to a protocol record for the current instance of the protocol thus initiated at the mobile device. Throughout the protocol, the mobile device can continue to detect these mobile equipment and other objects in the space—such as relative to the space, room, or target equipment unit associated with the protocol active at the mobile device—and write additional time-stamped maps, tables, or other representations of the distribution of mobile equipment and other objects in the space to this protocol record, such as continuously throughout this instance of the protocol (e.g., once per second) or when the mobile device detects that these mobile equipment and objects have moved in the space.

Furthermore, once the operator confirms a particular protocol, the mobile device can confirm that mobile equipment specified in the particular protocol is present at or near the corresponding equipment unit. For example, the mobile device can: implement methods and techniques described above to construct a map, table, or other representation of the room, including types and locations of mobile equipment and other mutable objects in the field of view of the mobile device; and then compare this map, table, or other representation of the room to a list of objects specified by the particular protocol to isolate any missing equipment, materials, or other objects. The mobile device can then render a prompt—via the heads-up display—to retrieve any missing equipment, materials, or other objects before initiating the elected protocol.

9. PROTOCOL GUIDANCE

Once the protocol for the equipment unit is selected, verified, and loaded onto the mobile device, the mobile device can render a sequence of instructions in the protocol within the augmented reality environment, thereby enabling the operator to view real-time instructions spatially aligned to features on the equipment unit that relate to these instructions.

9.1 Device Position and Protocol Guidance

Generally, in Block S142, the mobile device can implement methods and techniques described above to track its positions in real space based on optical data collected by the optical sensor(s) and based on the localization map for the room. For example, for each subsequent set of concurrent frames recorded by a set of optical sensors in the mobile device, the mobile device can: compile this set of concurrent frames into a sparse 3D point cloud; and calculate a sensor transform that aligns features in the sparse 3D point cloud to surfaces represented in the localization map of the room, such as to surfaces that represent the equipment unit specifically in the localization map. This sensor transform can thus represent the pose of the optical sensors in real space relative to the room or to the equipment unit more specifically. The mobile device can then apply a sensor-to-display transform—that represents a known offset between the optical sensors and the heads-up display—to the sensor transform to calculate a display transform that represents the pose of the optical sensors in real space relative to the room or to the equipment unit more specifically. The mobile device can inject augmented reality content (e.g., spatially-referenced textual and/or graphical instructions) into a next (augmented reality) frame based on this display transform in order to align this content to the equipment unit in the operator's field of view.

Alternatively, the protocol can specify registration of a particular instruction to a particular feature on the equipment unit. During execution of the protocol, the mobile device can thus: select a next instruction within the protocol; scan an image recorded by the optical sensor(s) for a feature linked to this next instruction; extract a pose of the optical sensor relative to this feature (or vice versa) from the image; and locate the instruction in a next augmented reality frame based on the pose of the optical sensor relative to this feature and a known offset from the optical sensor to the heads-up display.

However, the mobile device can implement any other method or technique to locate augmented reality content—for the current instruction in the protocol—within an augmented reality frame. The mobile device can then render this augmented reality frame on the heads-up display in (near) real-time and then repeat this process to inject augmented reality content for the current instruction in subsequent augmented reality frames based on each subsequent image recorded by the optical sensor(s) as the operator moves through real space.

The mobile device can then index to a next instruction in the protocol and repeat the foregoing methods and techniques responsive to manual confirmation by the operator that the current step of the protocol has been completed. Alternatively, the mobile device can: implement computer vision and/or artificial intelligence techniques to automatically detect that the current step of the protocol has been completed and index to a next step accordingly; or automatically index to the next step of the protocol after automatically recording data from the equipment unit according to the current step, as described below. The mobile device can then repeat the foregoing methods and techniques to render spatially-located instructions for the next steps of the protocol—in the augmented reality environment—until the protocol is completed.

9.2 Data Capture

In one variation, the mobile device automatically records data from the equipment unit during execution of the protocol by the operator. In one implementation, a particular step of the protocol specifies automated recordation of a value from a particular display on the equipment unit (e.g., an analog dial or gauge, a digital display). In this implementation, the space model (e.g., the localization map) can specify a position of this display on the equipment unit, and the mobile device can: calculate its pose in real space relative to the equipment unit based on features detected in an image recorded by the optical sensor and the space model; and isolate a region of the image corresponding to the display based on the pose of the mobile device and the location of the display specified in the space model. Alternatively, the mobile device can detect the display directly in this image, such as by detecting a reference optical fiducial located on the equipment unit immediately adjacent the particular display or by implementing template-matching techniques to isolate a region of the image that represents the display. The mobile device can repeat this process for each subsequent image recorded by the optical sensor during this step of the protocol in order to track the position of display relative to the mobile device.

When the mobile device determines that the position of the optical sensor falls within a threshold distance (e.g., one meter) and within a threshold angular offset (e.g., 15° in each dimension) of the display based on features detected in a current image recorded by the optical sensor, the mobile device can extract a value from a region of this image corresponding to the display. For example, the mobile device can: isolate a region of this image corresponding to the display; implement optical character recognition and/or other computer vision techniques to extract a value from this region of the image; and write this value to an electronic lab notebook or other data repository associated with the equipment unit and/or with current execution of the protocol.

In this variation, the mobile device can also calculate a quality of this image (e.g., a resolution of the region of the image corresponding to the display, a sharpness of the image) and/or a confidence score that the value extracted from this region of the image is accurate. If the quality of the image is less than a threshold quality or if the confidence score is less than a threshold score, the mobile device can render—on the heads-up display—a prompt for the operator to move closer to the display to enable automated documentation of this step in the protocol. Alternatively, if the quality of the image is less than a threshold quality or if the confidence score is less than a threshold score, the remote computer system can repeat the foregoing process to opportunistically record a second image as the operator moves around the equipment unit, to extract data from a region of the second image representing the display, and to quantify a quality of the second image and/or data extracted from this second image as the operator performs the current step of the protocol. If the quality of the second image and/or the confidence score for data extracted from the second image exceeds that of the previous image, the remote computer system can override data extracted from the previous image with data extracted from the second image. The remote computer system can repeat this process until the current step of the protocol is completed, until the quality of the last image recorded exceeds the threshold quality, and/or until the confidence score for data extracted from the last image exceeds the threshold score.

In this variation, this step of protocol can additionally or alternatively specify manual recordation of a value from the display, and the mobile device can: implement similar methods and techniques to calculate the location of the display relative to the heads-up display; generate an augmented reality frame containing a highlighted (e.g., a "green") boundary that encompasses the display on the equipment unit when the augmented reality frame is rendered on the heads-up display; populate the augmented reality frame with an instruction to record a value from this display; and then render this augmented reality frame on the heads-up display in (near) real-time in order to prompt the operator to manually record data from the display. The mobile device can repeat this process until the operator manually confirms that this step has been completed or until the mobile device automatically determines that this step is complete.

9.3 Protocol Observation

A step in the protocol can also specify recordation of video (or a still image) during performance of this step.

Accordingly, the mobile device can: automatically record a video (or a still image) during execution of this step by the operator and append a report for this instance of the protocol with this video (or still image). A second remote operator or administrator can access this video in real-time in order to manually verify that this step was performed properly. Alternatively, the second operator portal or administrator can review this video hours, days, or weeks following conclusion of the protocol in order to verify this step of the protocol.

However, the mobile device can implement any other method or technique to automatically record values from a display on the equipment unit, to record a particular step of the protocol, or to record the protocol in its entirety during execution by the operator.

9.4 Gated Protocol Steps

In one variation shown in FIG. 5, the mobile device limits (or "gates") access to a step in the protocol based on location of the mobile device. For example, for an action step specifying an input (e.g., selection of a control input, adjustment of a valve, supply of material) at a particular location at the equipment unit or in the space, the mobile device can prevent confirmation of this action step and/or prevent access to a next step in the protocol until the mobile device determines that its location falls within a threshold distance (e.g., one meter; a sum of 50 centimeters and a localization tolerance of the mobile device and space model) of the particular location associated with this action step. Similarly, for a data capture step specifying recordation of data (e.g., in the form of a manually-input value, automatic data capture by the mobile device, audio capture, image capture, or video capture) at a particular location at the equipment unit or in the space (e.g., at a location of a dial or screen displaying data designated for capture in this step), the mobile device can prevent manual entry of data, optical or audio captured triggered by the user, or automatic data captured by the mobile device until the mobile device determines that its location falls within a threshold distance of the particular location associated with this data capture step.

Therefore, the mobile device can regularly execute the foregoing methods and techniques to recalculate the location of the mobile device throughout the protocol and selectively enable the user to open a next step in the protocol, confirm completion of a step, supply data specified in a step, and/or transition to a next step based on whether the mobile device has moved within a threshold distance of locations in the space (or relative to the equipment unit) associated with these steps in the protocol.

10. PROTOCOL COMPLETION+SPACE DEPARTURE

In one variation, the mobile device discards the space model (and or the equipment model) when the mobile device determines that it has exited the space or moved more than a threshold distance from the equipment unit following completion or closure of the current instance of the protocol.

In one implementation, the mobile device: downloads the space model for the particular space once the remote computer system determines that the mobile device is occupying the particular space, as described above; and tracks positions of the mobile device within the particular space based on positions of optical features detected in the field of view of the optical sensor relative to reference features represented in the space model over a period of time (e.g., during the current instance of the protocol). However, upon conclusion of this instance of the protocol (or after the user pauses or cancels this instance of the protocol), the mobile device may: detect absence of reference features—represented in the space model—in the field of view of the optical sensor; and predict departure of the mobile device from the particular space accordingly. The mobile device can then: discard the space model for the particular space; aggregate a new list of wireless APs now wirelessly accessible to the mobile device; and send this new list of wireless APs and a request for location services to the remote computer system. The remote computer system can then execute methods and techniques described above to estimate a new location of the mobile device and to return a second space model—for the new space now occupied by the mobile device—to the mobile device.

Alternatively, in the foregoing implementation, the mobile device can: cache the (earlier) space model; download the second space model responsive to moving into a different space in the building; localize the mobile device in the building based on both of these space models as the user moves between these spaces; and only discard one of these cached space models if the mobile device fails to determine that it has entered the space represented by the model in more than a threshold duration of time (e.g., four hours, one day).

11 PROTOCOL REPORTS

In one variation as shown in FIGS. 3 and 5, the mobile device (or the remote computer system) compiles data collected during the instance of the protocol into a protocol report. The remote computer system can then load this protocol report into a database or other repository to enable post-hoc access, review, and verification of steps performed and data collected during this instance of the protocol.

In one implementation, the mobile device: initializes a new protocol report for the current instance of the protocol; writes identifiers of the user, the protocol, and the equipment unit to the new protocol report; regularly tracks it location and orientation in the space (and/or relative to the equipment unit) during this instance of the protocol; generates a sequence of timestamped geotags defining these locations and orientations, such as at a rate of one geotag per second during the protocol; and writes this sequence of geotags to the new protocol report, such as in real-time. The mobile device also writes timestamped step events to the new protocol report, including identifiers (e.g., step numbers) of each completed step, and the times that each completed step was opened, paused, and/or closed or otherwise indicated complete by the user. Similarly, the mobile device can write timestamped data capture events to the new protocol report, including manually-entered data values, automatically-derived data values, audio clips, images, and/or video clips recorded during each completed data capture step of the protocol.

Upon completion of this instance of the protocol, the mobile device can upload this new protocol report to the remote computer system or to a remote database for storage. Alternatively, the mobile device can stream these locations, step events, and data capture events to the remote computer system in (near) real-time during this instance of the protocol, and the remote computer system can compile and store these data in a new protocol report for this instance of the protocol.

However, the mobile device and/or the remote computer system can implement any other method or technique to record positions of the mobile device, step events, and data capture events and to compile these data into a protocol record of the this instance of the protocol.

12. PROTOCOL REVIEW

A remote reviewer or verifier may then elect to review this instance of the protocol by replaying this protocol record. For example, a reviewer portal executing on the remote reviewer's computing device (e.g., a desktop computer) can: load a local copy of the protocol record or stream data from the protocol record from the remote database when selected by the reviewer; render a 2D or 3D representation of the space in which this instance of the protocol was performed; and render 2D footsteps or a 3D visualization of a human body in the 2D or 3D representation of the space, respectively, according to locations and orientations defined in geotags in the protocol record. In particular, when the reviewer elects to "replay" the protocol record within the reviewer portal, the reviewer portal can render the 2D footstep or 3D visualization of a human body within the virtual representation of the space in order of and timed according to timestamped geotags—defining the mobile device's location and orientation during this instance of the protocol—stored in the protocol report. During replay of the protocol record, the reviewer portal can also: identify a step of the protocol open at the mobile device when the mobile device occupies the indicated location in the virtual representation of the space, such as based on timestamped event data contained in the protocol record; retrieve a prompt, guidance, or other specification for the current step; and render this information over or adjacent the virtual representation of the space. Similarly, the reviewer portal can: identify an instance of data capture during this instance of the protocol based on timestamped data capture events contained in the protocol record; extract capture data from the protocol record for the current step depicted in the reviewer portal; and present this information to the reviewer, such as by rendering numerical data over a minimal dwell duration of 12 seconds, rendering textual data and static images over a minimal dwell duration of 30 seconds, and automatically replaying audio and video clips time-synchronized to location and orientation playback over the virtual representation of the space.

In the foregoing example, the reviewer portal can also replay the protocol record at fixed or variable increased speed (e.g., at 2×, 4×, 10×, or 60× of real-time), thereby enabling the reviewer to review and verify the instance of the protocol in less time than the protocol instance itself. Alternatively, the reviewer portal can implement the foregoing methods and techniques to replay select segments of the protocol record for the reviewer—such as around key events including completion of each step and recordation of data during this instance of the protocol—thereby enabling the reviewer to review critical segments of the protocol record more likely to depict errors and thus reduce total review time for this instance of the protocol.

Furthermore, throughout playback of the protocol record, the reviewer portal can record error flags entered by the reviewer, generate timestamped error events synchronized to locations, step events, and data capture events in the protocol record; and write these error events to the protocol record accordingly.

Therefore, the mobile device can generate a protocol record that includes relevant time, location, step, and data capture information packaged in a relatively small, robust file that: consumes limited local or remote storage (e.g., relative to a video of the whole instance of the protocol); can be accessed quickly for remote review and verification; and that still enables a reviewer or remote verifier to confirm that the instance of the protocol was completed properly or otherwise identify and flag errors during this instance of the protocol.

Additionally or alternatively, the mobile device can stream data from the protocol record for the current instance of the protocol to the reviewer portal in real-time, and the reviewer portal can implement the foregoing methods and techniques to replay an animation of the current instance of the protocol—currently performed by the user—in (near) real-time, thereby enabling the reviewer to monitor the user's progress, manually verify or flag a step of the protocol for the user, and selectively enable the user to access subsequent steps of the protocol, such as while working remotely from the user.

12.1 Error Surfacing

Figure 4:
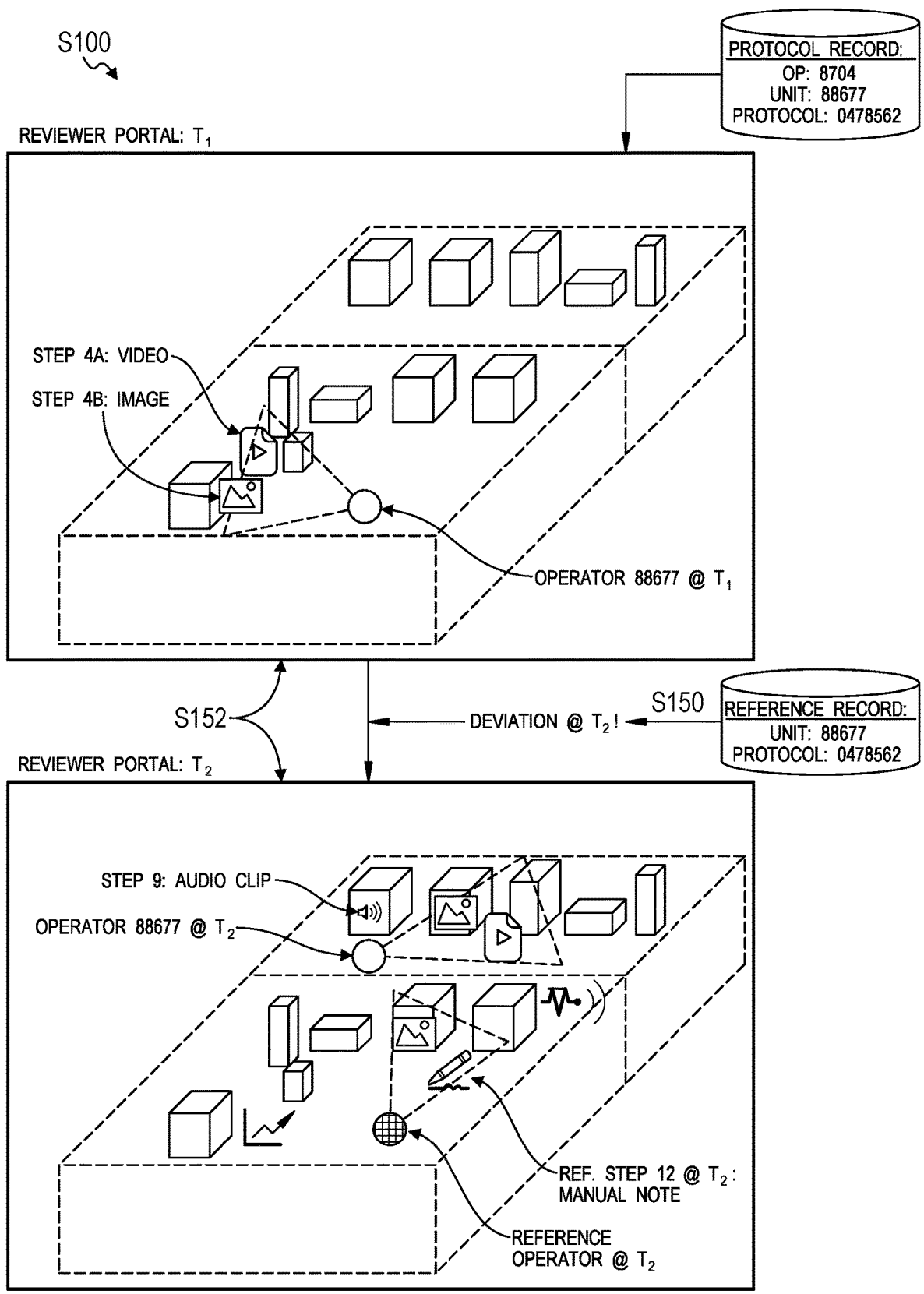
FIG. 4 is a graphical representation of one variation of the method.

In one variation shown in FIGS. 4 and 5, the remote computer system: compares the protocol record for this instance of the protocol with protocol records from previous instances of the protocol to identify deviations between the current and previous instances of the protocol in Block S150; and then selectively surfaces these deviations to the reviewer for verification in Block S152, such as by selectively replaying segments of the protocol record spanning such deviations. In particular, the remote computer system can detect deviations between the current and past instances of the protocol in various domains, such as: values of data captured; locations of the mobile device in the space or relative to the equipment unit when data was captured; start times of steps in the protocol; duration of steps in the protocol; order of locations occupied in the space or relative to the equipment unit; proximity to reference locations in the space or on the equipment unit linked to steps in the protocol; spatial variance within steps in the process; and/or temporal variance within steps in the process; etc. Thus, when the remote computer system identifies a deviation between the current and previous instances of the protocol based on comparisons of protocol records for these protocol instances, the remote computer system can: selectively notify the reviewer of this deviation; and interface with the reviewer portal to replay a segment of the protocol record for the current instance of the protocol that spans the step containing this deviation.

In one implementation, the remote computer system: aggregates protocol records for past instances of the protocol performed at the same equipment unit and/or at similar equipment units in the same space, in the same building, on the same site, or at other sites affiliated with the same entity; retrieves errors flags or verification confirmation for each of these past instances of the protocol; generates one vector per protocol record representing time, location, and data metrics from this protocol record; and labels each vector with its error flags or verification confirmation. The remote computer system then implements regression, clustering, deep learning, and/or artificial intelligence techniques to group like vectors and derive correlations between time, location, and data metrics and error and verification outcomes for these past instances of the protocol. Upon receipt of the protocol record for the new instance of the protocol completed by the user, the remote computer system can: generate a similar vector for this new instance of the protocol and predict errors in this new instance of the protocol based on correlations learned from the previous instances of the protocol. For example, the remote computer system can: implement clustering techniques to identify a cluster of vectors—representing previous instances of the protocol—nearest the new vector representing the new instance of the protocol; and transfer error labels from this cluster of vectors to the new vector. The remote computer system can then: isolate a set of segments of the protocol record that (likely) depict these errors; serve a notification to the reviewer to review this protocol record; and serve or stream this set of segments of the protocol record to the reviewer protocol for local replay for the reviewer.

In another implementation, the remote computer system: aggregates protocol records for past instances of the protocol performed at the equipment unit, etc.; filters this set of past protocol records to include only those verified and labeled as absent of errors; and implements regression, deep learning, artificial intelligence, and/or other techniques to compress this filtered set of protocol records into one reference protocol record, such as containing a range (or "band") of spatial, temporal, and data capture metrics that occur in verified instances of the protocol (and that do not occur in erroneous steps in these instances of the protocol). Upon receipt of a new protocol record for the new instance of the protocol completed by the user at the mobile device, the remote computer system can: compare spatial, temporal, and data capture values stored in the new protocol record to the reference mobile device; identify values in the new protocol record that fall outside of the ranges defined in the reference protocol record; and flag these values for review. The remote computer system can then interface with the reviewer portal to selectively serve segments of the new protocol record in which these flagged values were recorded, such as: a complete step in which a flagged value was recorded; or a one-minute segment of the protocol record centered around a time that a flagged value was recorded during this instance of the protocol.

Therefore, in the foregoing implementations, the remote computer system can: access a set of stored protocol records for a set of previous instances of the protocol; detect a deviation between orders of positions of mobile devices represented in the first protocol record and represented in the set of stored protocol records; and then queue a particular segment of the protocol record containing the deviation for verification by the reviewer or remote verifier. Similarly, the remote computer system can: access a reference protocol record for the protocol; detect a deviation between position of the mobile device during a particular step in the new instance of the protocol and a reference location for the particular step defined in the reference protocol record; and then queue a segment of the protocol record containing the deviation for remote verification if this deviation exceeds a threshold deviation (e.g., a threshold distance of one meter). In this example, the remote computer system can also: detect a deviation across durations between confirmations of a first subset of steps in the new instance of the protocol and confirmations of this same subset of steps defined in the reference protocol record; and queue a segment of the protocol record containing this deviation for remote verification if this deviation exceeds a threshold deviation (e.g., one minute). More specifically, in this example, the remote computer system can flag a step in the new instance of the protocol if the new protocol record indicates that this step was completed in significantly more time or significantly less time than an average time or time range allocated for this step in the reference protocol record.

Accordingly, the remote computer system can prompt the reviewer to manually review these specific segments of the new instance of the protocol represented in the new protocol record—such as rather than the new protocol record in its entirety—and to identify errors or verify these specific segments of the new instance of the protocol. For each of these segments, the reviewer portal can then: render an animation of positions of the mobile device—represented in the corresponding segment of the new protocol record—over a spatial representation of the particular space; render data—captured during a period of the first instance of the protocol record depicted in the first segment of the protocol record—synchronized to the animation of positions of the mobile device; and serve a prompt to the remote verifier to verify accurate completion of one or more steps in the protocol depicted in this animated segment of the protocol record.

Upon receipt of error flags or verification of proper completion of these segments of the new instance of the protocol, the remote computer system can label the new protocol record accordingly and then retrain correlations between metrics contained in protocol records and error outcomes based on this new labeled protocol record. Additionally or alternatively, the remote computer system can recalculate ranges of spatial, temporal, and data capture metrics that occur in verified instances of the protocol (and that do not occur in erroneous steps in these instances of the protocol) based on this new labeled protocol record.

However, the remote computer system can implement any other method or technique to: detect deviations between the new and past instances of the protocol or otherwise isolate segments of the new instance of the protocol that may contain errors; and then selectively prompt a reviewer or remote verify to review data in the new protocol record that represented these targeted segments of the new instance of the protocol.

12.2 Protocol Record Comparison

In another variation, the reviewer portal accesses: a set of protocol records (e.g., a reference protocol record and new protocol record) for the same protocol and for the same or similar equipment unit; synchronizes a start point of these protocol records (e.g., based on timestamps of activation of a first step in these instances of the protocol); and then implements the foregoing methods and techniques to replay the set of protocol records concurrently within the same virtual representation of the space (or the same virtual representation of a volume around the equipment unit). The reviewer portal can thus enable the reviewer to visually compare the corresponding instances of the protocols and quickly detect differences—and possible sources of error—between these instances of the protocol.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a operator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for assisting execution of manual protocols at production equipment comprising:
   accessing a first protocol defining a first step, in a sequence of steps, for operation by a user within a particular site, the first protocol specifying a target location within the particular site and a target condition proximal the target location;
   accessing a first set of identifiers from a first set of wireless access points accessible by a mobile device associated with the user at the particular site;
   based on the first set of identifiers of the set of wireless access points, identifying a first location within the particular site occupied by the mobile device;
   in response to the first location falling proximal the target location specified in the first protocol:
      at a first time, accessing a first image captured from an optical sensor arranged proximal the target location;
      extracting a first set of features from the first image;
      calculating a first position of the mobile device proximal the target location at a first resolution based on positions of the first set of features relative a constellation of reference features representing the target location;
   in response to the first position of the mobile device falling within a first threshold distance of a first equipment unit within a field of view of the optical sensor, extracting a first condition from the first image corresponding to a particular value presented at the first equipment unit; and
   in response to identifying a deviation between the first condition and the target condition specified in the first protocol:
      flagging a current protocol record representing a current instance of the protocol by the user; and
      replaying a first segment of the current protocol record containing the first step in the protocol.

2. The method of claim 1:
   wherein accessing the first image comprises, accessing the first image captured from an optical sensor integrated at the mobile device associated with the user at the first location;
   further comprising, in response to the first position of the mobile device falling within a first threshold distance of a first a first equipment unit within field of view of the optical sensor:
      isolating a first region in the first image corresponding to a particular display of the first equipment unit;
      extracting the first condition from the first region in the first image corresponding to a particular value presented at the particular display; and
      storing the first condition in the current protocol record containing a first set of conditions captured during the current instance of the first protocol.

3. The method of claim 1, wherein flagging the current protocol record containing the deviation comprises, in response to identifying the threshold deviation between the first condition of the current protocol record and a previous condition, defining the target condition, of a previous instance of the first protocol, flagging the current protocol record containing the deviation.

4. The method of claim 1, wherein flagging the current protocol record containing the deviation comprises, at a remote computer system, in response to identifying a deviation between the first condition and a target condition defined in the first protocol, replaying a first segment of the current protocol record that spans the first step containing the deviation.

5. The method of claim 1:
   wherein calculating the first position of the mobile device comprises, calculating a first position of the mobile device within the first location at a first resolution in response to proximity of the mobile device to a low-risk zone defined in a space model of the first location and associated with the first step in the first protocol, based on positions of the first set of features relative to the constellation of reference features represented in the space model of the first location; and
   further comprising, in response to the first position for the mobile device falling within the first threshold distance of a first reference location proximal the first equipment unit associated with the first step in the first protocol, serving a first guidance for the first step to the user, the first guidance comprising a prompt to capture data at a second reference location proximal the first equipment unit following execution of a preceding control action at the first reference location proximal the first equipment unit.

6. The method of claim 1, further comprising:
   at a second time following the first time, accessing a second image captured from the optical sensor arranged proximal the first location;
   extracting a second set of features from the second image;
   calculating a second position of the mobile device within the first location at a second resolution greater than the first resolution based on the positions of the second set of features and the constellation of reference features representing the first location; and
   in response to identifying proximity of the second position of the mobile device to a high-risk zone defined in a space model of the first location and associated with the first step in the first protocol, serving a prompt to cease motion for a period of time.

7. The method of claim 1, wherein accessing the first protocol defining the first step, in the sequence of steps, for operation by the user within the particular site comprises:
   accessing an operator profile associated with the user currently assigned to the mobile device;
   accessing a first set of protocols associated with the operator profile, the first set of protocols comprising the first protocol;
   accessing a set of equipment units associated with the operator profile, the set of equipment units comprising the first equipment unit;
   aggregating a second set of protocols queued for the first equipment unit located in the particular building occupied by the user;

filtering the second set of protocols based on the first set of protocols associated with the operator profile to generate a third set of protocols;
rendering the third set of protocols on an integrated display coupled to the mobile device; and
in response to receiving selection of the first protocol from the third set of protocols, loading the first protocol from a remote computer system.

8. The method of claim 1, further comprising:
at a second time following the first time, accessing a second image captured from the optical sensor arranged proximal the first location;
extracting a second set of features from the second image;
calculating a second position of the mobile device within the first location at a second resolution greater than the first resolution based on the positions of the second set of features and the constellation of reference features representing the first location;
in response to the second position of the mobile device falling within a second threshold distance proximal the first equipment unit:
  defining a particular control input in a cluster of control inputs at a control panel on the first equipment unit depicted in the second image;
  extracting a particular location of the particular control input from the second image;
  calculating a third position of the particular control input in the field of view of a viewfinder rendered on a heads-up display coupled to the mobile device, based on a first offset between the optical sensor and the heads-up display;
  generating an augmented reality frame containing a visual object distinguishing the particular control input in the cluster of control inputs and visually aligned with the particular control input;
  rendering the augmented reality frame on the heads-up display;
  serving a prompt to perform the first step according to a first guidance in the protocol; and
  tracking a location of the mobile device relative the particular control input on the first equipment unit.

9. The method of claim 1:
identifying the first location occupied by the mobile device comprises, at a remote computer system, identifying the first location occupied by the mobile device at a first time based on identifiers of the set of wireless access points received from the mobile device;
further comprising, at the mobile device:
  downloading a space model for the first location in response to the remote computer system identifying the first location occupied by the mobile device at the first time;
  tracking positions of the mobile device within the first location based on positions of optical features detected in the field of view of the optical sensor relative to reference features represented in the space model over a first period of time;
  detecting absence of reference features, represented in the space model, in the field of view of the optical sensor at a second time succeeding the first period of time;
  in response to detecting absence of reference features, represented in the space model, in the field of view of the optical sensor:
    predicting departure of the mobile device from the first location; and
    discarding the space model for the first location; and
further comprising, in response to predicting departure of the mobile device from the first location:
  accessing identifiers of a second set of wireless access points wirelessly accessible to the mobile device at the second time; and
  based on identifiers of the second set of wireless access points and known locations of wireless access points within the particular building, identifying a second space within the particular building occupied by the mobile device at the second time.

10. The method of claim 1:
wherein calculating the first position of the mobile device within the first location comprises:
  calculating a first transform that projects the first set of features onto corresponding reference features in a space model representing the first location with a first error; and
  calculating the first position of the mobile device, at the first resolution, within the first location at the first time based on the first transform; and
further comprising:
  following completion of the first step in the protocol, loading the second step in the protocol associated with a particular element on the equipment unit;
  at the mobile device, serving a prompt to cease motion for a period of time;
  accessing a second image recorded by the optical sensor during the period of time;
  extracting a second set of features from the second image;
  calculating a second transform that projects the second set of features onto corresponding reference features in the space model with a second error less than the first error;
  calculating a second position of the mobile device, at a second resolution greater than the first resolution, within the first location at a second time based on the second transform; and
  rendering the second guidance for the second step, visually aligned with the particular element on the equipment unit, on a display coupled to the mobile device based on the second position of the mobile device at a second time.

11. The method of claim 1, further comprising, in response to identifying the deviation between the first condition and the target condition defined in the first protocol:
at a second device associated with a remote verifier, rendering an animation of the first position of the mobile device, represented in the protocol record, over a spatial representation of the first location;
rendering the first condition within the spatial representation of the first location and synchronized to the first position of the mobile device represented within the spatial representation based a first timestamp of the first image; and
serving a prompt to the remote verifier to verify accurate completion of steps in the first instance of the protocol depicted in the spatial representation of the first location.

12. The method of claim 1, wherein identifying the first location within the particular site occupied by the mobile device comprises:
at the mobile device, calculating a first geospatial coordinate, in a geospatial coordinate system, of a first location of the mobile device;

transmitting the first geospatial coordinate to a remote computer system;
at the remote computer system, identifying the mobile device at the particular site in response to the first geospatial coordinate intersecting a boundary associated with the particular site; and
aggregating the first set of identifiers of the first set of wireless access points within range of the mobile device;
predicting occupation of the mobile device at the first location in the particular site based on the first set of wireless access points and a network map for the particular site;
loading a set of space models representing each space at the particular site;
accessing a sequence of images from the optical sensor;
extracting a set of features from the sequence of images captured by the optical sensor; and
identifying a first space model in the set of space models, based on the set of features extracted from the sequence of images.

13. A method for assisting execution of manual protocols at production equipment comprising:
accessing a protocol defining a sequence of steps for operation by a user within a particular site;
extracting a first set of identifiers of a first set of wireless access points accessible by a mobile device associated with the operator at the particular site;
based on the first set of identifiers and a first step in the sequence of steps for the protocol, identifying a first location within the particular site occupied by the mobile device;
at a first time, accessing a first image captured from an optical sensor arranged proximal the first location;
extracting a first set of features from the first image;
calculating a first position of the mobile device within the first location at a first resolution and associated with the first step in the protocol, based on positions of the first set of features relative to a constellation of reference features representing the first location; and
in response to identifying proximity of the first position of the mobile device to a low-risk zone defined in a space model of the first location and associated with the first step in the first protocol, serving a first guidance for the first step to the user.

14. The method of claim 13, further comprising:
at a second time following the first time, accessing a second image captured from the optical sensor arranged proximal the first location;
extracting a second set of features from the second image;
calculating a second position of the mobile device within the first location at a second resolution greater than the first resolution based on the positions of the second set of features and the constellation of reference features representing the first location; and
in response to identifying proximity of the second position of the mobile device to a high-risk zone defined in a space model of the first location and associated with the first step in the first protocol, serving a prompt to cease motion for a period of time.

15. The method of claim 13:
wherein serving the first guidance for the first step to the user comprises, serving the first guidance comprising a prompt to capture data at a first equipment unit at the first location following execution of a preceding control action for the first equipment unit defined in the protocol; and further comprising:
at a second time following the first time, accessing a second image captured from the optical sensor arranged proximal the first location;
extracting a second set of features from the second image;
calculating a second position of the mobile device within the first location at a second resolution greater than the first resolution based on the positions of the second set of features and the constellation of reference features representing the first location; and
in response to the second position of the mobile device falling within a second threshold distance of the first equipment unit:
extracting a first condition from the second image corresponding to a particular value presented at the first equipment unit; and
storing the first condition in a current protocol record representing a current instance of the first protocol by the user and containing a set of conditions captured during a current instance of the protocol.

16. The method of claim 15, further comprising, in response to identifying a first deviation between the set of conditions of the current protocol record and a previous set of conditions of previous instances of the first protocol, replaying a first segment of the current protocol record containing the first deviation.

17. The method of claim 13, further comprising, in response to serving the first guidance to the user:
tracking a set of positions of the mobile device within the first location based on positions of features detected in the field of view of the optical sensor relative to reference features in a space model representing the first location during a first time period;
sequentially serving steps, in the sequence of steps defined in the protocol, to the user;
recording a first sequence of timestamps of confirmations of a subset of steps, in the sequence of steps, during the first time period;
recording a set of data, specified in a second subset of steps in the sequence of steps, during the first time period;
recording a second sequence of timestamps of the set of data, corresponding to the second subset of steps, during the first time period; and
compiling the set of positions of the mobile device, confirmations of the first subset of steps, and the set of data into a first protocol record of the first instance of the protocol based on the first sequence of timestamps and the second sequence of timestamps.

18. The method of claim 17, further comprising:
accessing a reference protocol record for the protocol;
detecting a deviation across durations between confirmations of the first subset of steps in the first protocol record and confirmations of the first subset of steps defined in the reference protocol record; and
in response to the deviation exceeding a threshold deviation, queuing a segment of the first protocol record containing the deviation for remote verification.

19. A method for assisting execution of manual protocols at production equipment comprising:
accessing a first protocol defining a first step, in a sequence of steps, for operation by a user within a particular site, the first protocol specifying a target location within the particular site and a target condition proximal the target location;

accessing a first set of identifiers from a first set of wireless access points accessible by a mobile device associated with the user at the particular site;
based on the first set of identifiers of the set of wireless access points, identifying a first location within the particular site occupied by the mobile device;
in response to the first location falling proximal the target location specified in the first protocol:
- at a first time, accessing a first image captured from an optical sensor arranged proximal the target location;
- extracting a first set of features from the first image;
- calculating a first position of the mobile device proximal the target location at a first resolution based on positions of the first set of features relative a constellation of reference features representing the target location; and
- in response to the first position of the mobile device falling within a first threshold distance of a first equipment unit within a field of view of the optical sensor, extracting a first condition from the first image corresponding to a particular value presented at the first equipment unit; and in response to identifying a deviation between the first condition and the target condition specified in the first protocol:
- rendering a graphical representation of the first position of the mobile device over a spatial representation of the first location; and
- rendering the first condition within the spatial representation of the first location and synchronized to the first position of the mobile device represented within the spatial representation based a first timestamp of the first image.

20. The method of claim 19, further comprising in response to identifying the deviation between the first condition and the target condition, replaying a first segment of a current protocol record containing the first step in the protocol.

* * * * *